United States Patent [19]

Kurata

[11] 4,015,941

[45] Apr. 5, 1977

[54] TEST TUBE ASSEMBLY

[75] Inventor: Motoji Kurata, Hatsukaichi, Japan

[73] Assignee: Japan Medical Supply Co., Ltd., Japan

[22] Filed: Jan. 29, 1976

[21] Appl. No.: 653,631

[30] Foreign Application Priority Data

Jan. 29, 1975 Japan ...................... 50-012443[U]

[52] U.S. Cl. .................................. 23/259; 23/292; 233/26

[51] Int. Cl.[2] ....................... B01L 3/14; G01N 1/10

[58] Field of Search ................ 23/259, 292; 233/26

[56] References Cited

UNITED STATES PATENTS

| | | | |
|---|---|---|---|
| 2,198,256 | 4/1940 | Levy | 233/26 |
| 2,351,708 | 6/1944 | Rubisslow | 233/26 |
| 3,720,502 | 3/1973 | Gropper et al. | 23/292 |

*Primary Examiner*—James H. Tayman, Jr.
*Attorney, Agent, or Firm*—Armstrong, Nikaido & Marmelstein

[57] ABSTRACT

A test tube assembly adapted to use for blood test comprising a holding tube, a test tube having a leg extending downwardly, the test tube being disposed in the holding tube and a foot of the leg being in touch with the bottom wall of the holding tube and, a cylindrical spacer disposed between the holding tube and the test tube at the upper part thereof to hold the latter within the holding tube.

4 Claims, 1 Drawing Figure

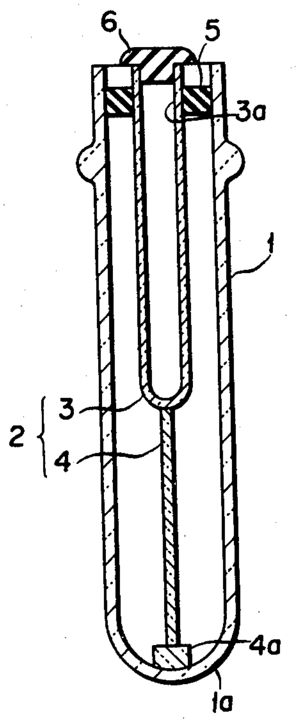
6
5
3a
1
2
3
4
4a
1a

TEST TUBE ASSEMBLY

BACKGROUND OF THE INVENTION

This invention relates to a test tube assembly and in particular to a test tube assembly adapted to use for blood test by using centrifugal separators.

Blood test is usually conducted by taking blood in a test tube and then disposing the test tube in one of holding tubes of a centrifugal separator to separate it.

Heretofore a common test tube has been used for this kind of blood test.

Those test tubes containing blood are disposed in holding tubes of centrifugal separators. A cylindrical elastomer is disposed between the holding tube and the test tube at the upper part thereof to firmly hold the latter with respect to the former and preventing the drop of the test tube.

However in this construction it sometimes happens by mishandling that the test tube containing blood fell to the bottom wall of the holding tube resulting in difficulty in taking it out and damage to the test tube.

SUMMARY OF THE INVENTION

It is, therefore, an object of the present invention to provide a test tube assembly adapted to use for blood test in which the test tube is holded tightly within a holding member to prevent dropping thereof.

In accordance with the present invention, the test tube assembly comprises a cylindrical holding member, a test tube having a leg extending downwardly, said test tube being disposed in said cylindrical holding member and a foot of the leg being in touch with the bottom wall of said cylindrical holding member, and a cylindrical spacer disposed between said holding member and said test tube at the upper part thereof to hold the latter within said holding member.

Since the leg of the test tube is being in touch with the bottom wall of the cylindrical holding member, the test tube can stand steadily within the cylindrical holding member without the fear of dropping.

Other objects, features and advantages of the present invention will be readily apparent from the following description taken in conjunction with the accompanying drawing.

BRIEF DESCRIPTION OF THE DRAWING

Attached drawing shows a longitudinal sectional view of the preferred embodiment of the present invention.

DETAILED DESCRIPTION OF THE PREFERRED EMBODIMENT

Reference numeral 1 denotes a holding tube provided radially on a centrifugal separator (not shown), and test tube 2 is disposed within the holding tube 1.

The test tube 2 comprises a body 3 which is shorter in length than the holding tube 1, preferably made of transparent synthetic resin, and a leg 4 extending downwardly from the bottom of the tube body 3. A foot 4*a* of the leg 4 is being in touch with a bottom portion 1*a* of the holding tube 1.

Disposed between the holding tube 1 and the test tube body 3 is a cylindrical spacer 5 to hold the test tube 2 within the holding tube 1 without permitting lateral movement of the test tube 2.

The spacer 5 is preferably made of rubber, elastomer, or the like.

An opening 3*a* of the test tube body 3 is closed by a lid 6, preferably made of rubber.

According to the test tube assembly of the present invention, since the foot 4*a* of the leg 4 which extends downwardly from the test tube body 3 is being in touch with the bottom portion 1*a* of the holding tube 1, the test tube 2 can stand steadily within the holding tube 1.

I claim:

1. A test tube assembly adapted to be used for blood testing said assembly comprising:

a cylindrical holding member;

a test tube disposed in said cylindrical holding member;

a leg connected to the bottom of said test tube for supporting said test tube within said holding member, said leg having a foot at one end thereof for stabilizing it within said cylindrical holding member, wherein the sum of the lengths of said test tube and said leg is equal to that of said cylindrical holding member; and means for holding said test tube within said cylindrical holding member for eliminating lateral movement of said test tube.

2. A test tube assembly as defined in claim 1, wherein said means is a spacer disposed between said cylindrical holding member and said test tube at the upper part thereof.

3. A test tube assembly as defined in claim 2, wherein said spacer is made of an elastomer.

4. A test tube assembly as defined in claim 1, further including a lid to close an opening of said test tube.

* * * * *